E. PASSBURG.
VACUUM COOLING AND DRYING APPARATUS FOR GRANULAR MATERIALS.
APPLICATION FILED JULY 15, 1912.

1,098,363.

Patented May 26, 1914.

Witnesses:
Harry H. Reiss
George G. Anderson

Inventor:
Emil Passburg,
By Hugh N. Wagner
His Attorney.

UNITED STATES PATENT OFFICE.

EMIL PASSBURG, OF BERLIN, GERMANY.

VACUUM COOLING AND DRYING APPARATUS FOR GRANULAR MATERIALS.

1,098,363.  Specification of Letters Patent.  Patented May 26, 1914.

Application filed July 15, 1912. Serial No. 709,443.

*To all whom it may concern:*

Be it known that I, EMIL PASSBURG, engineer, a citizen of the German Empire, residing at Berlin, Germany, have invented certain new and useful Improvements in Vacuum Cooling and Drying Apparatus for Granular Materials, of which the following is a specification.

My invention relates to apparatus for cooling warmed or predried granular materials particularly grain, under the action of a vacuum for storage purposes.

It has heretofore been attempted to cool dried material under a vacuum, but the known process could not be extensively used for large quantities of material, particularly for grain, in spite of the long felt want of such a process because the known vacuum cooling apparatus were designed primarily for other purposes than cooling grain and could not be used for that purpose. Moreover the known vacuum cooling apparatus are not suitable for continuous operation with grain in large quantities.

The object of my invention is to provide an improved cooling and drying apparatus which may be effectively used for the purpose stated.

To this end, my apparatus comprises at least three cooling vessels or containers for the grain issuing continuously from a drier in a warm state, of which vessels one is charged with the material coming from the drier, the second previously charged vessel is being highly evacuated, and the third is being emptied of the material previously cooled therein by the vacuum. In this manner both constant reception of the material coming from the drier or heater and also a sufficiently long action of the vacuum on the vessel acting for the time being as cooler, i. e. continuous operation, is guaranteed.

Figure 1:
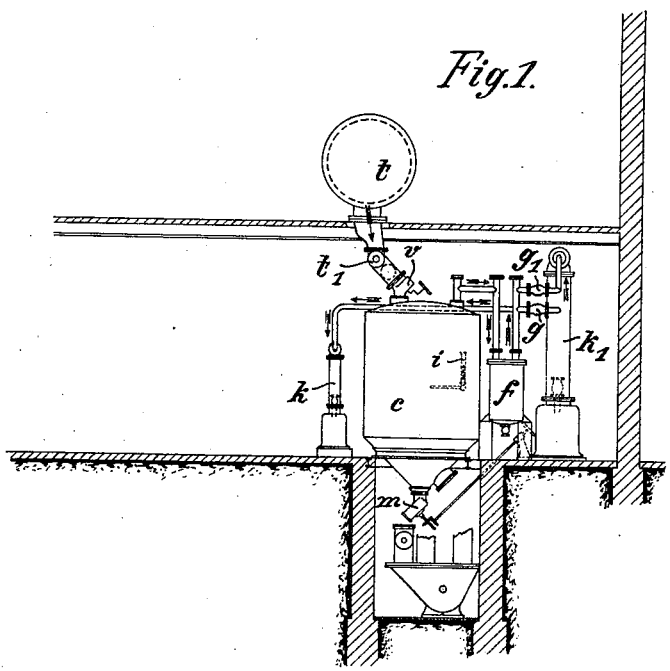
Figure 2:
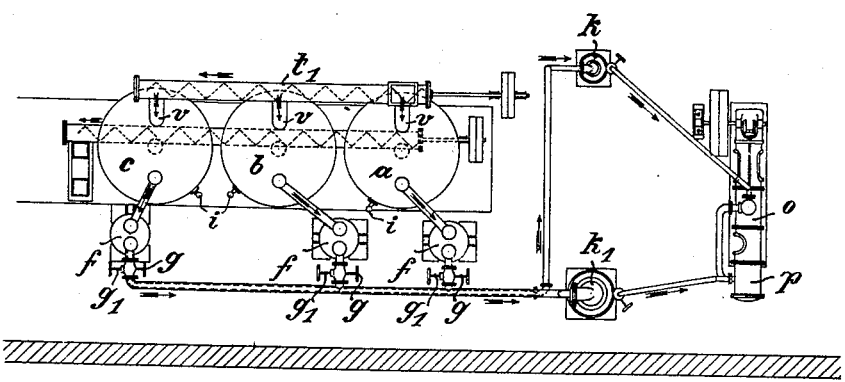

One embodiment of my invention is represented by way of example in the accompanying drawing, wherein:

Figure 1 is a side elevation and Fig. 2 a top plan view showing my improved cooling plant.

Referring to the drawing, the cooling plant comprises at least three cooling vessels or containers $a, b, c$, which are connected by way of valves $v$ with a drying apparatus $t$, Fig. 1 having a conveyer worm $t_1$, working under a vacuum or at atmospheric pressure.

Each cooler $a, b, c$, is connected with a device $f$ for collecting the dust from the grain, and each of these dust collectors is controlled by two valves $g$ and $g_1$. The valves $g$ are connected by piping to a small condenser $k$ connected with a common, ordinary air-pump $o$ for producing slight vacua, while the valves $g_1$ are connected to the condenser $k_1$ connected with an air-pump $p$ for producing a high vacuum. Further, each cooler $a, b, c$, possesses a discharge valve $m$ for the discharge of the cooled grain. The temperature of the coolers can be read at the thermometers $i$.

This cooling and drying plant operates as follows:—The heated grain runs out of the drying or heating apparatus $t$ having the conveyer worm $t_1$ into the cooler $a$, and when this cooler is charged, its valve $v$ is closed and the valve $v$ of the cooler $b$ is opened, whereupon the grain now runs into the cooler $b$. Valve $g$ in cooler $a$ is opened, whereupon the air-pump $o$ produces a vacuum of 27 to 28" in said cooler $a$, while the particles of dust carried along with the air are retained in the dust collector $f$, which is filled with water, and only the pure vapor from the heated grain passes into the condenser $k$ where it is condensed to some extent according to the vacuum obtained. The valve $g$ is then closed and the valve $g_1$ is opened, and a high vacuum of 29 to $29\frac{1}{2}$" is then obtained in the cooling apparatus by means of the pump $p$. Due to this high vacuum, the water in the warm grain evaporates at a temperature of from 30–20° C., and consequently the grain is cooled at this temperature as the rising vapor condenses in the large condenser $k_1$, wherein the grain is further dried when the water is emptied. This cooling produces at the same time a drying action, contrary to the known air cooling apparatus, in which it often happens that the dried grain again becomes wet owing to the moisture of the air.

When the grain in the cooler $a$ is sufficiently cooled in consequence of the vaporization of the water, the valve $v$ of the cooler $b$ is closed and the valve $v$ of the cooler $c$ opened. The grain is then allowed to run into the cooler $c$ after the cooler $b$ has been filled with grain, while the operation described before takes place in the evacuated cooler $b$. Air is then let into the cooler $a$ and the lower valve $m$ opened, whereupon the cooled grain runs into a conveyer worm which delivers it into an elevator which in turn lifts it into silos or directly into railway cars, steamers or the like. In this manner the three coolers are filled, evacuated and emptied in turn, the current of grain continuously running into them out of the drier being continuously cooled and dried.

The air-pump is preferably formed as a compound air-pump in such manner that a vacuum of about 0.10 atm. pressure is first produced in the coolers by the air-pump cylinder $o$ for low vacua, as described, before the cooler in question is connected to the air-pump cylinder $p$ for high vacua, while the pump cylinder $o$ for low vacua sucks away the air behind the valves of the cylinder $p$ for producing a high vacuum up to 0.03 atmo. or 0.016 atmo. in the pump cylinder $p$. The small condenser $k$ is not needed, if the grain leaving the drier has a temperature of not more than 40–45° C. But if the grain is warmer, vapors arise at a vacuum of about 27″ mercury column, which cannot be permitted to enter the pump $o$, until they have been condensed in the condenser $k_1$. For continuous effective working of the pump $p$ to obtain high vacuum, the main quantity of air must be taken out of the cooler by the pump $o$, which is connected with the pump $p$; the latter is then only used to balance the difference of the low vacuum of 27″ and the high vacuum of 29″.

It is obvious that the pump $p$ can permanently be used for high vacuum in the coolers filled with air, without the acting of the air pump $o$, as described, but this operation has disadvantages.

I claim:

1. Cooling and drying apparatus for warm granular material comprising at least three large vessels, a main drier; and means for producing a vacuum in each vessel, each of which vessels in turn is successively filled with the material, is subjected to a high vacuum to cool and dry the material, and discharges the cooled and dried material, said vessels being arranged below and connected with said main drier.

2. Cooling and drying apparatus for warm granular material comprising at least three vessels, each being provided with an inlet valve and an outlet valve; a main drier; an air-pump; a pipe connecting each vessel with the air-pump; and valves for controlling the connection of each vessel with said pipe, each of said vessels being used in turn to successively receive, cool and dry under a high vacuum, and to discharge the cooled and dried material, said vessels being arranged below and connected with said main drier.

3. Cooling and drying apparatus for warm granular material comprising at least three vessels, each being provided with an inlet valve and an outlet valve; a main drier; a compound air-pump having a low vacuum cylinder and a high vacuum cylinder; a low vacuum pipe connecting the former cylinder with each vessel; a high vacuum pipe connecting the latter cylinder with each vessel; and valves for controlling the connection of each vessel with the said low vacuum and high vacuum pipes, said vessels being arranged below and connected with said main drier.

4. Cooling and drying apparatus for warm granular material consisting, in combination with a main drier; of at least three vessels, each of said vessels being provided with an inlet valve and an outlet valve; and an air-pump connected with each of said vessels, one of said vessels being connected by way of its inlet valve with the main drier, during the time that the second in turn, which has previously been filled, is connected with the air-pump and is being highly evacuated, and the third is being emptied.

In testimony whereof I hereunto affix my signature in the presence of two witnesses.

EMIL PASSBURG.

Witnesses:
 HENRY HASPER,
 WOLDEMAR HAUPT.